United States Patent [19]
Tanji et al.

[11] Patent Number: 5,767,900
[45] Date of Patent: Jun. 16, 1998

[54] DIGITAL APPARATUS FOR CONTOUR ENHANCEMENT OF VIDEO SIGNAL

[75] Inventors: Ichiro Tanji; Taku Kihara, both of Kanagawa, Japan

[73] Assignee: Sony Corporation, Tokyo, Japan

[21] Appl. No.: 577,139

[22] Filed: Dec. 22, 1995

[30] Foreign Application Priority Data

Dec. 28, 1994 [JP] Japan .................................. 6-337661

[51] Int. Cl.⁶ .......................... H04N 9/64; H04N 5/208
[52] U.S. Cl. .......................... 348/253; 348/625; 348/630
[58] Field of Search ........................... 348/252, 253, 348/625, 627, 630; 382/254, 266, 268, 269, 270, 273, 275; H04N 5/208, 9/64, 5/21

[56] References Cited

U.S. PATENT DOCUMENTS

| | | |
|---|---|---|
| 4,504,853 | 3/1985 | Faroudja et al. |
| 4,623,924 | 11/1986 | Wargo ................................ 348/625 |
| 5,170,249 | 12/1992 | Ohtsubo et al. |
| 5,200,824 | 4/1993 | Kageyama ........................... 348/625 |
| 5,359,473 | 10/1994 | Kaniwa ............................... 360/77.14 |
| 5,389,979 | 2/1995 | Jeong ................................... 348/644 |
| 5,465,414 | 11/1995 | Moskaluk .............................. 455/313 |

OTHER PUBLICATIONS

Patent Abstracts of Japan, vol. 18, No. 246 (E-1546), 11 May 1994 & JP-A-06 030305 (CASIO), 4 Feb. 1994 abstract.

IEEE Journal of Solid-State Circuits, vol. 26, No. 5, May 1991, New York, US, pp. 727-737, XP000228230, D'Luna: "a systems approach to custom VLSI for a digital color imaging system", paragraph III.E: Fig. 10, 13.

Fernseh Und Kinotechnik, vol. 43, No. 8, Jun. 1989, Berlin DE, pp. 417-426, XP000053812 VOGT: "zweidimensionale digitale Aperturentzerrung für HDTV-Kameras", paragraph 2: Fig. 1.

*Primary Examiner*—Sherrie Hsia
*Attorney, Agent, or Firm*—Frommer Lawrence & Haug LLP; William S. Frommer

[57] ABSTRACT

Digital processing apparatus for correcting an image enhancement signal having a shape includes a peak detector for detecting and holding peak levels of the image enhancement signal and an adjustment circuit, responsive to the peak levels, for correcting the image enhancement signal to reduce its peak levels while substantially maintaining its shape and to limit the signal levels of the image enhancement signal to a range of levels substantially between a first predetermined peak limit and a second predetermined peak limit.

34 Claims, 6 Drawing Sheets

DIGITAL APPARATUS FOR CONTOUR ENHANCEMENT OF VIDEO SIGNAL

BACKGROUND OF THE INVENTION

The present invention relates to a video signal processing apparatus for digitally enhancing the contours of a video signal and is especially useful in a television camera.

In a color television (or video) camera, one or more camera pickup devices, such as a camera tube or a charge-coupled device (CCD), converts light from an image into three video signals. Typically, the three video signals are initially analog signals representing the red, green, and blue components, collectively "RGB," of the light that forms an image. In modern camera systems, each of the video signals is subjected to a variety of signal processing operations to compensate for inherent characteristics of the system and of the methodology for producing the video signal. For example, such signal processing may include dynamic color shading, knee processing, static color shading, and gamma correction.

Certain video cameras incorporate a device for enhancing the contours of the image represented by the color video signals. Here the term "contour" is used to refer to the boundaries between colored areas in an image. Without contour enhancement, the image reproduced from a particular set of color video signals tends to have blurred contours. Often, such blurring is noticeable to a viewer and is perceived as poor image quality. To prevent such image deterioration, video signals are subjected to a contour enhancement process.

Both analog and digital contour enhancement circuitry have been developed utilizing somewhat analogous signal processing techniques. In the digital contour enhancement circuit each of the three (red, green, blue) analog color signals is converted into a respective digital signal. The digital red, green, and blue signals are weighted, e.g. multiplied by a particular factor, and summed to produce a luminance signal. The luminance signal is subjected to certain delay amounts to produce a number of delayed signals. Lastly, a detail signal is generated by combining the luminance signal with the delay signals by means of addition and subtraction operations. The resulting detail signal varies in pulse form across the contours (edges) of the luminance signal.

Unfortunately, the detail signal thus produced accentuates both distinct and blurred contours in the original image. Addition of this detail signal to the digital color signals enhances the blurred contours but overenhances the distinct contours resulting in image deterioration. To remedy this shortcoming, circuitry has been developed to clip the peak levels of the detail signal to a certain level to lessen the accentuation of already distinct contours By adding the clipped detail signal to the digital color signals, the blurred contours of the image represented by the color signals, and to a lesser extent the already distinct contours of that image, are enhanced. The resulting image is perceived to display an overall improvement in resolution.

Nonetheless, the clipping process still results in the overenhancement of distinct contours of the original image and tends to introduce other errors into the color signals. This overenhancement often appears as unnaturally wide contours in the reproduced image. Additionally, this phenomena, compounded by the conversion of the digital signals to an analog form, may appear in the reproduced image as areas of substantial distortion caused by false signals and overshoot. The clipping process, being severely nonlinear, creates higher harmonics in the detail signal which are distributed within the bandwidth of the color signals upon digital-to-analog signal conversion. These higher harmonics can be perceived in the reproduced image as image deterioration.

OBJECTS AND SUMMARY OF THE INVENTION

An object of the present invention is to provide apparatus for producing a contour enhancement signal that enhances the contours of a video signal without overenhancing already fine contours.

Another object of the present invention is to provide apparatus for producing a contour enhancement signal that enhances the contours of a video signal without introducing noise into the video signal which substantially affects the quality of the image represented by the video signal.

More specifically, it is an object of the present invention to prevent signal deterioration caused by contour enhancement which is characteristic of digital contour enhancement circuits utilizing a clipping circuit to limit the detail signal.

A still further object of the present invention is to provide apparatus for producing a contour enhancement signal that is limited between two predetermined levels without overshoot.

In accordance with an aspect of the present invention, a digital processing apparatus for correcting an image enhancement signal having a shape is provided which includes a peak detector for detecting and holding the peak levels of the image enhancement signal and an adjustment device, responsive to the peak levels, for correcting the image enhancement signal to reduce its peak levels while substantially maintaining its shape.

In accordance with another aspect of the present invention, a digital processing apparatus for correcting an image enhancement signal having a shape is provided which includes an envelope detector for detecting the envelope of the image enhancement signal and an adjustment device, responsive to the envelope, for correcting the image enhancement signal to reduce its peak levels while substantially maintaining its shape.

In accordance with yet another aspect of the present invention, a digital processing apparatus for generating a contour enhancement signal for a video signal is provided which includes a generating device for generating a contour signal representative of a contour represented by the video signal and a correction device for correcting the contour signal to prevent substantial overenhancement of a fine contour represented by the video signal.

Other objects, features, and advantages according to the present invention will become apparent from the following detailed description of illustrated embodiments when read in conjunction with the accompanying drawings in which the same components are identified by the same reference numerals.

DETAILED DESCRIPTION OF THE PREFERRED EMBODIMENTS

Figure 1:
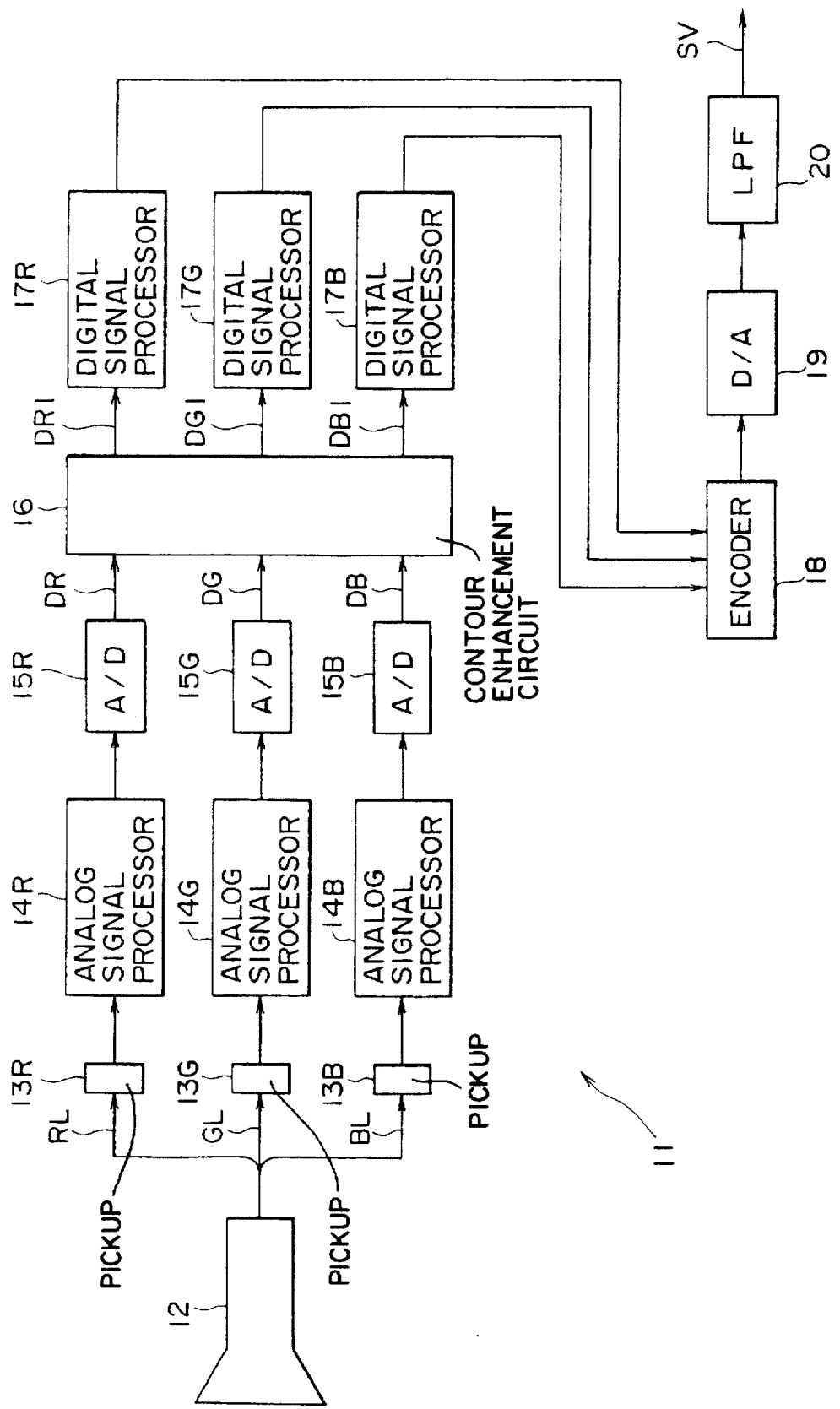
FIG. 1 is a block diagram of a video camera incorporating a contour enhancement circuit according to an embodiment of the present invention.

FIG. 1 illustrates a television camera system, indicated generally at 11, incorporating a contour enhancement circuit according to an embodiment of the present invention. Television camera system 11 is comprised of a lens system 12; image pickup devices 13R, 13G, and 13B; analog signal processors 14R, 14G, and 14B; analog-to-digital (A/D) converters 15R, 15G, and 15B; contour enhancement circuit 16; digital signal processors 17R, 17G, and 17B; encoder 18; digital-to-analog (D/A) converter 19, and lowpass filter 20. Preferably, the television camera system is contained in a single housing.

Lens system 12 is a conventional device, such as a lens followed by a dichroic mirror array, for acquiring an image and splitting light from the image into its basic components. Preferably, light from an acquired image is divided into its constituent red light (RL), green light (GL), and blue light (BL) components. Each of the three colored lights is focused upon a respective image pickup device 13R, 13G, and 13B. Preferably, the image pickup devices are solid-state charge-coupled devices (CCD). Each image pickup device generates an image signal representative of the light incident thereupon and supplies the image signal to a respective analog signal processor 14R, 14G, and 14B.

The analog signal processors 14R, 14G, and 14B convert the image signals into color signals and apply correction processes, such as shading correction, to correct the signals. The corrected red color signal is supplied to A/D 15R, the corrected green color signal is supplied to A/D 15G, and the corrected blue color signal is supplied to A/D 15B. Each A/D converter converts a respective analog color signal into a corresponding digital color signal, one of DR, DG, and DB. All three color signals are supplied to contour enhancement circuit 16.

Contour enhancement circuit 16 generates a detail signal representing the contours of the image represented by signals DR, DG, and DB. The detail signal is added to each of the digital color signals to enhance the contours represented by each. The contour enhanced signals DR1, DG1 and DB1, corresponding to signals DR, DG, and DB, respectively, are supplied to digital signal processors 17R, 17G, and 17B, respectively. A more detailed discussion of the preferred construction and operation of a contour enhancement circuit according to the present invention will be presented in connection with FIG. 2.

Digital signal processors 17R, 17G, and 17B process the signals DR1, DG1, and DB1, respectively, to adjust and further correct these signals for transmission and/or display. Such adjustment and correction processes may include, for example, gamma correction and knee processing. The processed digital color signals are supplied to encoder 18. Encoder 18 weights and combines the processed digital color signals to produce a digital luminance signal and digital color difference signals which are converted into analog forms by D/A converter 19. The analog luminance and color difference signals are low-pass filtered by filter 20 to limit their bandwidths, and the filtered signals thus produced comprise an output video signal SV.

Figure 2:
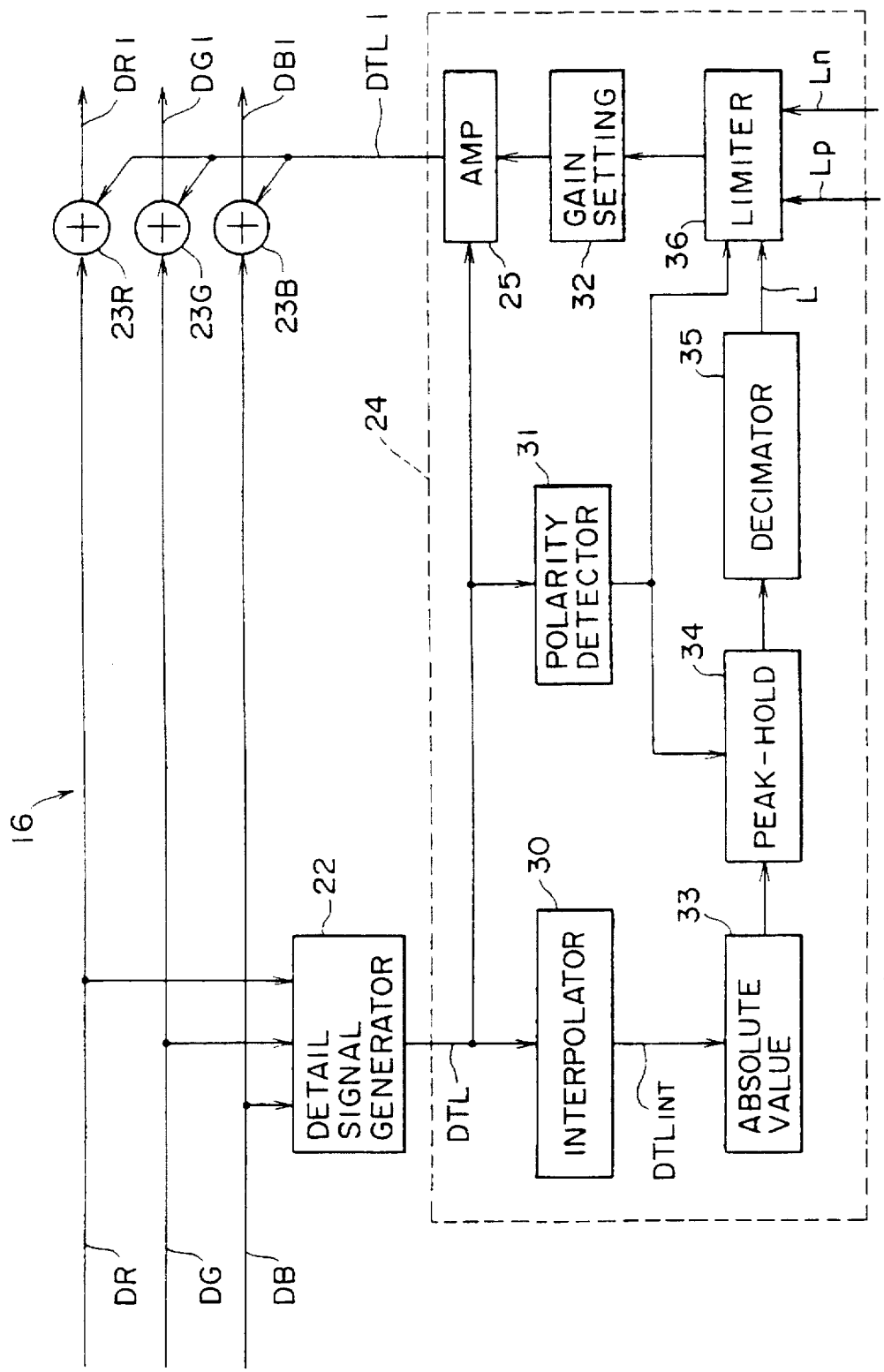
FIG. 2 is a block diagram of a contour enhancement circuit according to an embodiment of the present invention.

FIG. 2 illustrates a preferred embodiment of the contour enhancement circuit 16 described briefly above. The contour enhancement circuit 16 is comprised of a detail signal generator 22; adders 23R, 23G, and 23B; and detail signal correction circuit 24. As described above, the contour enhancement circuit receives three digital color signals DR, DG, and DB, generates a detail signal DTL1, and adds the detail signal DTL1 to each digital color signal to produce contour enhanced signals DR1, DG1, and DB1, respectively.

Specifically, detail signal generator 22 receives each digital color signal DR, DG, and DB; adder 23R receives signal DR, adder 23G receives signal DG, and adder 23B receives signal DB. The detail signal generator generates a luminance signal by weighting and combining the digital color signals DR, DG, and DB. The luminance signal is delayed in the horizontal direction by two predetermined amounts of time to obtain two horizontally delayed versions of the luminance signal. The original luminance signal is combined, preferably in a linear manner, with the two horizontally delayed versions of the luminance signal to produce a horizontal contour signal representing the horizontal contours of the luminance signal.

The luminance signal is also delayed in the vertical direction by two predetermined amounts of time to obtain two vertically delayed versions of the luminance signal. The original luminance signal is combined, preferably in a linear manner, with the two vertically delayed versions of the luminance signal to produce a vertical contour signal representing the vertical contours of the luminance signal. The horizontal contour signal and the vertical contour signal are combined to produce detail signal DTL which is supplied to detail signal correction circuit 24.

As will be appreciated by one of ordinary skill, the present invention is not limited to any particular method of generating contour signals or a detail signal DTL since a variety of methods for generating such signals exist. Similarly, the following description of the correction of a luminance-based detail signal can be adapted to other types of detail signals or other correction signals and such adaptation clearly falls within the scope of the present invention. Accordingly, the luminance signal described herein is intended to facilitate clear explanation of the present invention and is not intended as a limit thereupon.

Detail signal correction circuit 24 is comprised of interpolator 30, absolute value forming circuit 33, polarity detector 31, peak-hold circuit 34, decimator 35, limiting circuit 36, gain setting circuit 32, and amplifier 25. The detail signal correction circuit processes detail signal DTL to limit the positive and negative peak levels of the signal to specified values while minimizing the introduction of errors into the corrected signal.

Detail signal DTL is supplied to interpolator 30 for interpolation, also referred to as "upsampling" or "upconverting." Preferably, interpolater 30 is comprised of a digital filter circuit which interpolates the sampling of detail signal DTL to produce a detail signal $DTL_{INT}$ with twice the sampling frequency of signal DTL. Detail signal $DTL_{INT}$ is supplied to absolute value forming circuit 33 which produces an absolute value signal representing the absolute value of detail signal $DTL_{INT}$. The absolute value signal is supplied to peak-hold circuit 34.

Polarity detector 31 also receives detail signal DTL and detects the polarity of the signal. The detected polarity is supplied to peak-hold circuit 34 and to limiting circuit 36 in the form of a polarity signal.

Peak-hold circuit 34 tracks and holds the peak values of the absolute value signal to produce a peak signal. The peak values are held for a fixed interval which corresponds to a feature of signal DTL. Preferably, the time constant of peak-hold circuit 34 corresponds to the rising and falling time period of the signal level of detail signal DTL. In this manner, peak-hold circuit 34 functions as an envelope detector to smooth the absolute value signal. The envelope of the interpolated detail signal $DTL_{INT}$ is more easily and accurately detected than the original detail signal DTL because $DTL_{INT}$ has a higher sampling frequency. Without upsampling, the envelope detector is prone to erroneous detection caused by frequency beat components that can occur when the frequency of the input signal is near the frequency of an integral submultiple of the sampling frequency.

Circuit 34 also receives the polarity signal and supplies both the peak signal and the corresponding polarity signal to decimator 35. Decimator 35, preferably comprised of a digital filter, interpolates and converts the peak signal to produce an interpolated peak signal L having the original sampling frequency of detail signal DTL.

Signal L, the polarity signal, a predetermined positive limit signal Lp, and a predetermined negative limit signal Ln are supplied to limiting circuit 36. When signal L corresponds to a positive value of detail signal DTL, as indicated by the polarity signal, that does not exceed the value Lp, limiting circuit 36 outputs the Lp signal. Similarly, when signal L corresponds to a negative value of detail signal DTL, as indicated by the polarity signal, that does not exceed the value Ln, limiting circuit 36 outputs the Ln signal. Otherwise, circuit 36 outputs signal L. The signal output by circuit 36 and the polarity signal are supplied to gain setting circuit 32.

Figure 3A:
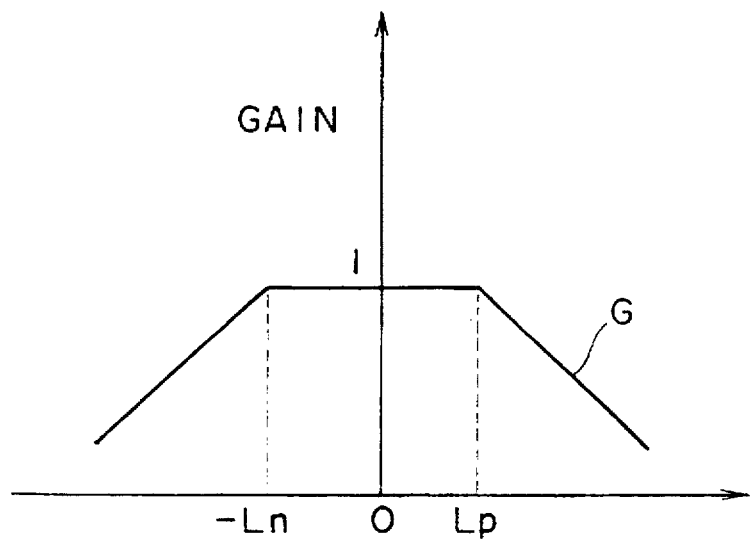
FIG. 3A and 3B are signal diagrams to which reference will be made in describing the operation of the contour enhancement circuit of FIG. 2.

If the polarity signal indicates that detail signal DTL is positive, then gain setting circuit 32 divides the quantity Lp by the value represented by the signal output from circuit 36 to produce a gain signal. If the polarity signal indicates that detail signal DTL is negative, then gain setting circuit 32 divides the quantity Ln by the value represented by the signal output from circuit 36 to produce the gain signal. The gain signal is supplied to amplifier 25 to set the gain of the amplifier. As illustrated in FIG. 3A, the gain G is set at unity for values of L between -Ln and Lp and at values of less than unity for values of L outside of this range. Outside the range, the gain generally decreases for increasingly positive or increasingly negative values of L.

Optionally, the gain setting circuit 32 smoothly varies the gain for predetermined periods of time immediately prior to and immediately after peak values of detail signal DTL are reached. Such variation further insures that corrected detail signal DTL1 maintains a constant level during peak value periods of detail signal DTL and that signal DTL1 is not improperly distorted as compared to detail signal DTL.

Amplifier 25 is a variable-gain amplifier for amplifying detail signal DTL according to the gain signal supplied by gain setting circuit 32 to produce a corrected detail signal DTL1. Preferably, amplifier 25 functions as a multiplying circuit to multiply detail signal DTL by the gain signal to produce signal DTL1. By varying the gain signal as described above, detail signal DTL is corrected such that the positive and negative peak levels of the resulting detail signal DTL1 do not exceed Lp and Ln, respectively. Optionally, amplifier 25 may additionally produce signal DTL1 as a smoothly varying signal. As another alternative, the gain signal may be lowpass filtered to produce a smooth detail correction signal.

Figure 3B:
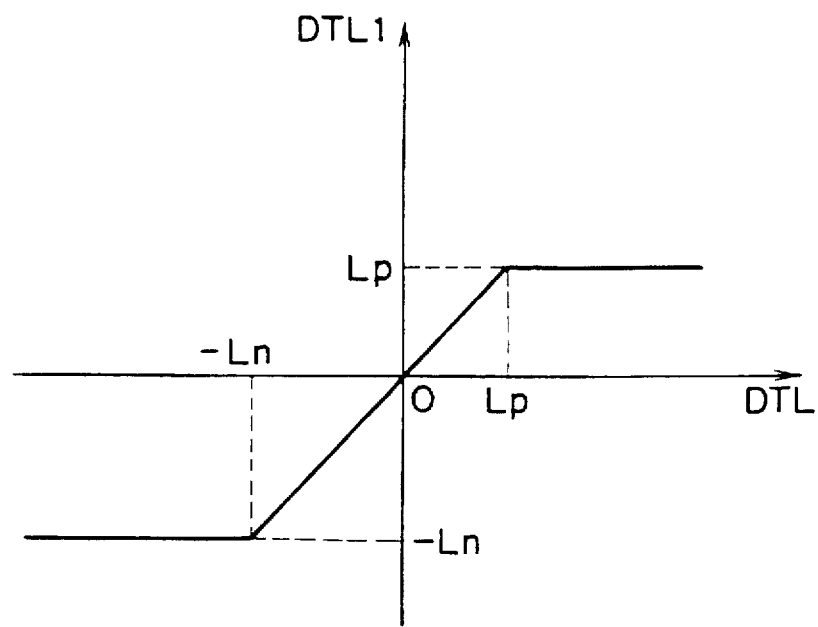

FIG. 3B illustrates the general relationship between detail signal DTL and corrected detail signal DTL1. As shown, detail signal DTL1 can be approximately defined as:

DTL1=-Ln for DTL<=-Ln;
DTL1=DTL for -Ln<DTL<Lp; and
DTL1=Lp for DTL>=Lp.

Detail signal DTL1 is added to each of digital color signals DR, DG, and DB by adders 23R, 23G, and 23B, respectively, to produce, respectively, contour enhanced signals DR1, DG1, and DB1. By the foregoing means, the contours of the image represented by digital color signals DR, DG, and DB are enhanced.

As compared to clipping, amplifier 25 corrects detail signal DTL according to a signal limiting process which causes relatively fewer higher harmonics to appear in the corrected detail signal DTL1. correspondingly, the occurrence of false signals and overshoot in the corrected signal are effectively prevented and waveform distortion is reduced. Further, unnatural widening of the contour and deterioration of the image represented by the color signals are prevented.

Additionally, the values of limit signals Lp and Ln can be manipulated to adjust the amount of contour enhancement which is produced to complement other processing of the color signals. For example, Lp and Ln can be adjusted so that the contour enhancement is not distorted by a gamma correction process. Specifically, if Lp is set to an amount appropriately greater than Ln, then balanced amounts of contour enhancement will remain in the color signals following gamma correction thereof.

Tests of the contour enhancement circuit according to an embodiment of the present invention confirm its efficacy in preventing the unnatural widening of contours and the generation of false signals. The results of these tests are illustrated in FIGS. 4A and 5A which depict the output signal SV of the camera system upon input of a luminance signal having a single 10%-to-90% pulse into the contour enhancement circuit.

Figure 4A:
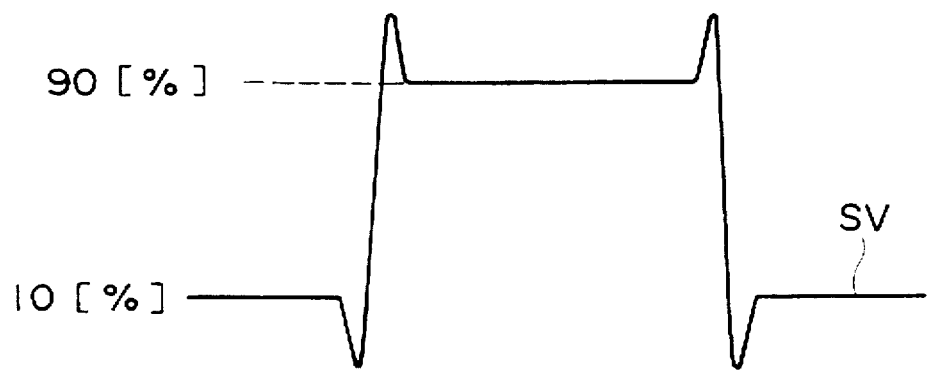
FIGS. 4A and 4B are signal diagrams to which reference will be made in describing the operation of the contour enhancement circuit of FIG. 2.
Figure 4B:
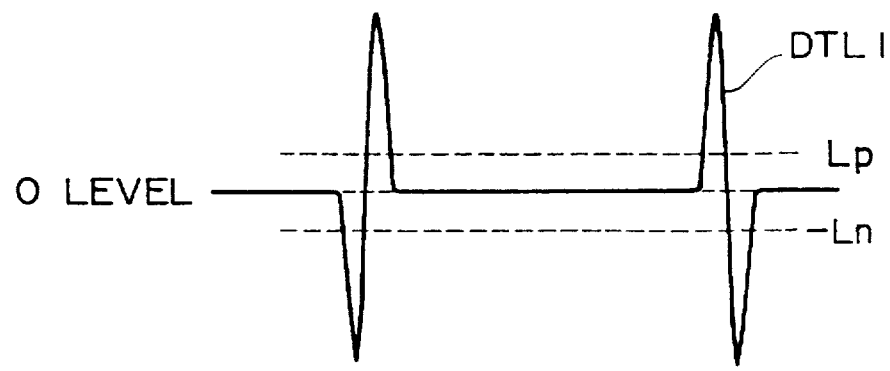
Figure 5A:
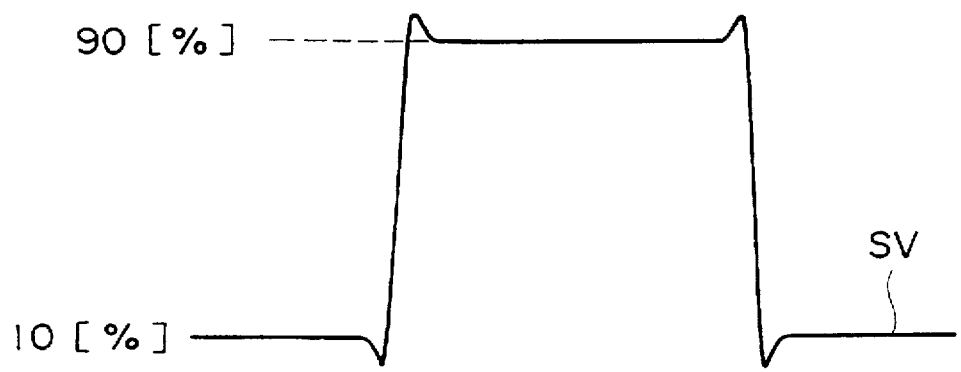
FIGS. 5A and 5B are signal diagrams to which reference will be made in describing the operation of the contour enhancement circuit of FIG. 2.
Figure 5B:
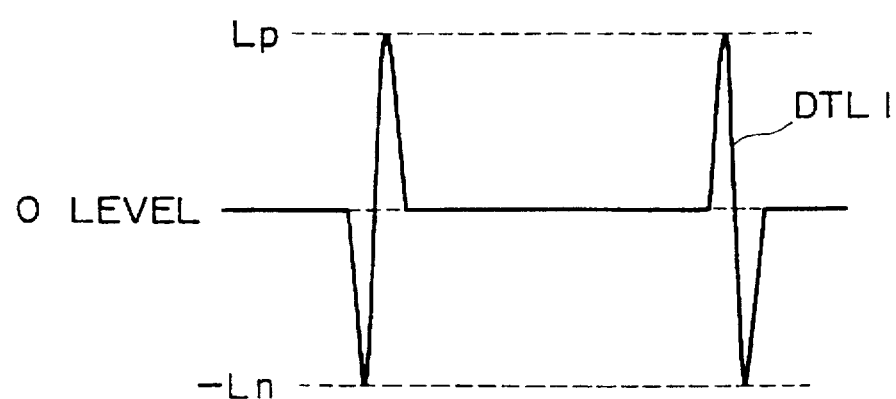

FIG. 4A illustrates the output signal SV produced when detail signal DTL is not corrected, that is, when the gain of amplifier 25 is set to unity. For such a case, FIG. 4B shows detail signal DTL1, having values that clearly exceed the range -Ln to Lp, that was generated and used to enhance the contours in output signal SV. In contrast, FIG. 5A illustrates the output signal SV produced when detail signal DTL is corrected in accordance with the present invention and when Ln and Lp are set to the same value. As shown, output signal SV tracks the input signal closely. FIG. 5B shows the detail signal DTL1 that was generated and used to enhance the contours in output signal SV. This signal has the same general shape as the waveform of FIG. 4B but is limited to the range -Ln to Lp.

Figure 6A:
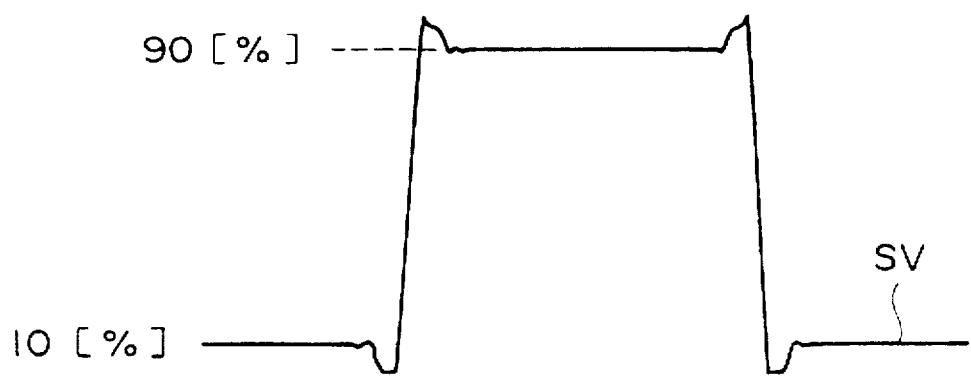
FIGS. 6A and 6B are signal diagrams to which reference will be made in describing the operation of a contour enhancement circuit incorporating a clipping circuit.
Figure 6B:
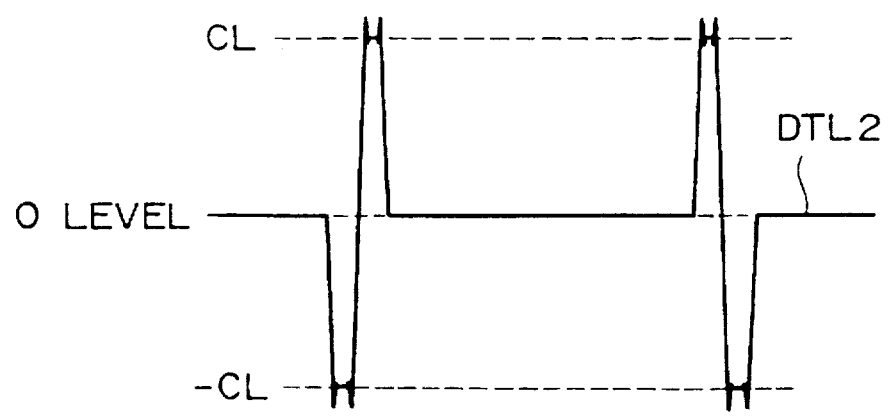

For the purposes of comparison, a contour enhancement circuit incorporating a clipping circuit, supplied with a single 10%-to-90% luminance pulse input signal, produced the output signal of FIG. 6A. In FIG. 6A, it is clear that signal SV does not follow the input signal as quickly as did the output signal produced by the contour enhancement circuitry of the present invention. Further, the clipping circuit produces a ringing effect bordering the edges of the output pulse which deteriorate the quality of the image represented thereby. The detail signal DTL2 produced by the clipping process is shown in FIG. 6B. Although clipping is performed at the clipping level CL, overshoot occurred, false signals were generated, and a widening of the resulting waveform was observed.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A digital processing apparatus for correcting an image enhancement signal having a shape, said apparatus comprising:

peak detector means for detecting and holding a plurality of peak levels of said image enhancement signal; and adjustment means, responsive to said plurality of peak levels, for correcting said image enhancement signal to reduce the peak levels of said image enhancement signal while substantially maintaining said shape;

wherein said adjustment means is further responsive to a first predetermined peak limit and to a second predetermined peak limit independent of said first predetermined peak limit and wherein said adjustment means limits said image enhancement signal to a range of signal levels substantially between said first predetermined peak limit and said second predetermined peak limit.

2. A digital processing apparatus for correcting an image enhancement signal having a shape, said apparatus comprising:

peak detector means for detecting and holding a plurality of peak levels of said image enhancement signal; and adjustment means, responsive to said plurality of peak levels, for correcting said image enhancement signal to reduce the peak levels of said image enhancement signal while substantially maintaining said shape;

wherein said adjustment means is further responsive to a first predetermined peak limit and to a second predetermined peak limit and wherein said adjustment means limits said image enhancement signal to a range of signal levels substantially between said first predetermined peak limit and said second predetermined peak limit; and wherein said adjustment means comprises:

determining means for determining an amount of amplification or an amount of attenuation needed to limit said image enhancement signal to said range of signal levels;

gain setting means for generating a gain signal representing the amount of amplification or attenuation needed; and variable-gain amplifier means for altering said image enhancement signal according to said gain signal.

3. Apparatus according to claim 2 wherein said peak detector means comprises interpolater means for generating an interpolated signal representing said image enhancement signal but having an increased sample frequency.

4. Apparatus according to claim 3 wherein said peak detector means further comprises:

absolute value generating means for generating an absolute value signal representing an absolute value of said interpolated signal and polarity detection means for detecting a polarity of said image enhancement signal.

5. Apparatus according to claim 4, wherein said peak detector means generates a peak signal representing said plurality of peak levels;

wherein said image enhancement signal has a sample frequency; and wherein said peak detector means further comprises decimator means for generating a decimated signal representing said peak signal but having said sample frequency.

6. Apparatus according to claim 1 wherein said adjustment means corrects said image enhancement signal substantially smoothly.

7. A digital processing apparatus for correcting a contour enhancement signal having a shape, said apparatus comprising:

peak detector means for detecting and holding a plurality of peak levels of said contour enhancement signal; and adjustment means, responsive to said plurality of peak levels, for correcting said contour enhancement signal to reduce the peak levels of said contour enhancement signal while substantially maintaining said shape;

wherein said adjustment means is further responsive to a first predetermined peak limit and to a second predetermined peak limit independent of said first predetermined peak limit and wherein said adjustment means limits said contour enhancement signal to a range of signal levels substantially between said first predetermined peak limit and said second predetermined peak limit.

8. A digital processing apparatus for correcting a contour enhancement signal having a shape, said apparatus comprising:

peak detector means for detecting and holding a plurality of peak levels of said contour enhancement signal; and adjustment means, responsive to said plurality of peak levels, for correcting said contour enhancement signal to reduce the peak levels of said contour enhancement signal while substantially maintaining said shape;

wherein said adjustment means is further responsive to a first predetermined peak limit and to a second predetermined peak limit and wherein said adjustment means limits said contour enhancement signal to a range of signal levels substantially between said first predetermined peak limit and said second predetermined peak limit; and wherein said adjustment means comprises:

determining means for determining an amount of amplification or an amount of attenuation needed to limit said contour enhancement signal to said range of signal levels;

gain setting means for generating a gain signal representing the amount of amplification or attenuation needed; and variable-gain amplifier means for altering said contour enhancement signal according to said gain signal.

9. Apparatus according to claim 8 wherein said peak detector means comprises interpolater means for generating an interpolated signal representing said contour enhancement signal but having an increased sample frequency.

10. Apparatus according to claim 9 wherein said peak detector means further comprises:

absolute value generating means for generating an absolute value signal representing an absolute value of said interpolated signal and polarity detection means for detecting a polarity of said contour enhancement signal.

11. Apparatus according to claim 10,
wherein said peak detector means generates a peak signal representing said plurality of peak levels;
wherein said contour enhancement signal has a sample frequency; and
wherein said peak detector means further comprises decimator means for generating a decimated signal representing said peak signal but having said sample frequency.

12. Apparatus according to claim 7 wherein said adjustment means corrects said contour enhancement signal substantially smoothly.

13. A digital processing apparatus for correcting an image enhancement signal having a shape, said apparatus comprising:
envelope detector means for detecting an envelope of said image enhancement signal; and
adjustment means, responsive to said envelope, for correcting said image enhancement signal to reduce the peak levels of said image enhancement signal while substantially maintaining said shape.

14. Apparatus according to claim 13 wherein said image enhancement signal is a contour enhancement signal.

15. A digital processing apparatus for generating a contour enhancement signal for a video signal, said apparatus comprising:
generating means for generating a contour signal representative of a contour represented by said video signal; and
correction means for correcting said contour signal to prevent substantial overenhancement of a fine contour represented by said video signal;
wherein said video signal represents an image;
wherein said video signal comprises:
a red signal representing a red component of said image;
a green signal representing a green component of said image; and
a blue signal representing a blue component of said image;
wherein said contour signal represents a weighted combination of said red signal, said green signal, and said blue signal; and
wherein said contour enhancement signal has a shape and wherein said correction means comprises:
peak detector means for detecting and holding a plurality of peak levels of said contour enhancement signal; and
adjustment means, responsive to said plurality of peak levels, for correcting said contour enhancement signal to reduce the peak levels of said contour enhancement signal while substantially maintaining said shape.

16. Apparatus according to claim 15 wherein said adjustment means is further responsive to a first predetermined peak limit and to a second predetermined peak limit and wherein said adjustment means limits said contour enhancement signal to a range of signal levels substantially between said first predetermined peak limit and said second predetermined peak limit.

17. Apparatus according to claim 16 wherein said adjustment means comprises:
determining means for determining an amount of amplification or an amount of attenuation needed to limit said contour enhancement signal to said range of signal levels;
gain setting means for generating a gain signal representing the amount of amplification or attenuation needed; and
variable-gain amplifier means for altering said contour enhancement signal according to said gain signal.

18. Apparatus according to claim 17 wherein said peak detector means comprises interpolater means for generating an interpolated signal representing said contour enhancement signal but having an increased sample frequency.

19. Apparatus according to claim 18 wherein said peak detector means further comprises:
absolute value generating means for generating an absolute value signal representing an absolute value of said interpolated signal and
polarity detection means for detecting a polarity of said contour enhancement signal.

20. Apparatus according to claim 19,
wherein said peak detector means generates a peak signal representing said plurality of peak levels;
wherein said contour enhancement signal has a sample frequency; and
wherein said peak detector means further comprises decimator means for generating a decimated signal representing said peak signal but having said sample frequency.

21. Apparatus according to claim 15 wherein said adjustment means corrects said contour enhancement signal substantially smoothly.

22. A television camera system comprising:
image pickup means for picking up an image of an object and outputting an analog video signal;
analog signal processor circuit for correcting the signal level of said analog video signal to produce a corrected analog video signal;
an analog-to-digital converter circuit for converting said corrected analog video signal to a digital video signal;
image enhancement means for generating a contour signal from said digital video signal and adding said contour signal to said digital video signal thereby producing an enhanced digital video signal with a contour thereof enhanced; and
a digital signal processing means for subjecting said enhanced digital video signal to correction processing including gamma correction;
wherein said image enhancement means includes:
a detail signal generator circuit for generating a detail signal by detecting a signal component of a contour of said digital video signal,
a detail signal correction circuit for correcting the signal level of said detail signal to produce said contour signal, and
an adder circuit for adding said contour signal to said digital video signal to produce said enhanced digital video signal,
wherein said detail signal correction circuit sequentially detects the peak levels of said detail signal and amplifies said detail signal in accordance with the peak levels detected such that the peak level of said contour signal is maintained not to exceed a specified value.

23. A television camera system according to claim 22, wherein said detail signal correction circuit includes:
an amplifier circuit for amplifying said detail signal thereby generating said contour signal, and
a gain control circuit varying the gain of said amplifier circuit according to the peak levels detected.

24. A television camera system according to claim 23, wherein said gain control circuit includes:
- a peak-hold circuit for peak-holding said detail signal for detecting the peak levels on the positive side and the negative side of said detail signal thereby detecting an envelope thereof and holding the signal level of said detail signal for a predetermined period between points before and after said detail signal reaches a peak level, and
- a correction circuit for setting specifying levels for use in specifying the gain of said amplifier circuit separately for the positive and negative sides and varying the gain of said amplifying circuit when said break level of said detail signal is greater than a specified level on the positive side or less than the specified level on the negative side.

25. Apparatus according to claim 13 wherein said adjustment means is further responsive to a first predetermined peak limit and to a second predetermined peak limit and wherein said adjustment means limits said image enhancement signal to a range of signal levels substantially between said first predetermined peak limit and said second predetermined peak limit.

26. Apparatus according to claim 25 wherein said adjustment means comprises:
- determining means for determining an amount of amplification or an amount of attenuation needed to limit said image enhancement signal to said range of signal levels;
- gain setting means for generating a gain signal representing the amount of amplification or attenuation needed; and
- variable-gain amplifier means for altering said image enhancement signal according to said gain signal.

27. Apparatus according to claim 26 wherein said envelope detector means comprises interpolater means for generating an interpolated signal representing said image enhancement signal but having an increased sample frequency.

28. Apparatus according to claim 27 wherein said envelope detector means further comprises:
- absolute value generating means for generating an absolute value signal representing an absolute value of said interpolated signal; and
- polarity detection means for detecting a polarity of said image enhancement signal.

29. Apparatus according to claim 28,
- wherein said envelope detector means generates a peak signal representing said peak levels of said image enhancement signal;
- wherein said image enhancement signal has a sample frequency; and
- wherein said envelope detector means further comprises decimator means for generating a decimated signal representing said peak signal but having said sample frequency.

30. Apparatus according to claim 25 wherein said adjustment means corrects said image enhancement signal substantially smoothly.

31. A digital processing apparatus for correcting an image enhancement signal having a shape, said apparatus comprising:
- envelope detector means for detecting an envelope of said image enhancement signal; and
- adjustment means, responsive to said envelope, a first predetermined peak limit, and a second predetermined peak limit, for limiting said image enhancement signal to a range of signal levels substantially between said first predetermined peak limit and said second predetermined peak limit while substantially maintaining said shape, said adjustment means including:
  - determining means for determining an amount of amplification or an amount of attenuation needed to limit said image enhancement signal to said range of signal levels;
  - gain setting means for generating a gain signal representing the amount of amplification or attenuation needed; and
  - variable-gain amplifier means for altering said image enhancement signal according to said gain signal.

32. Apparatus according to claim 31, wherein said envelope detector means comprises interpolater means for generating an interpolated signal representing said image enhancement signal but having an increased sample frequency.

33. Apparatus according to claim 32, wherein said envelope detector means further comprises:
- absolute value generating means for generating an absolute value signal representing an absolute value of said interpolated signal; and
- polarity detection means for detecting a polarity of said image enhancement signal.

34. Apparatus according to claim 33,
- wherein said envelope detector means generates a peak signal representing peak levels of said image enhancement signal;
- wherein said image enhancement signal has a sample frequency; and
- wherein said envelope detector means further comprises decimator means for generating a decimated signal representing said peak signal but having said sample frequency.

* * * * *